United States Patent Office 3,284,342
Patented Nov. 8, 1966

3,284,342
DESULPHURISATION OF HYDROCARBON MATERIALS
Wilfred Samuel Nathan, deceased, late of Sunbury-on-Thames, Middlesex, England, by Shirley Gertrude Nathan, Surbiton, Surrey, England, and Gerald Stanley Davis, London, England, personal representatives, and John Frederick Ford, Sunbury-on-Thames, England, assignors to The British Petroleum Company Limited, London, England, a British joint-stock corporation
No Drawing. Filed Nov. 21, 1961, Ser. No. 154,932
Claims priority, application Great Britain, Nov. 20, 1960, 40,093/60
10 Claims. (Cl. 208—208)

This invention relates to the desulphurisation of hydrocarbon materials, for example hydrocarbon materials of petroleum origin and in particular petroleum fractions of high molecular weight.

In general the presence of sulphur or sulphur-containing compounds is highly undesirable in petroleum crude oils, distillates and residues. Many of the valuable properties of these materials are seriously impaired by the presence of sulphur compounds which results in a downgrading of their commercial value.

In the past numerous processes have been employed either to eliminate undesirable sulphur compounds or to convert them into more innocuous forms. One type of process involves physical extraction with a liquid solvent such as sulphuric acid, sulphur dioxide, furfural and the like. Another type of process removes the sulphur compounds by adsorption on suitable materials, for example activated bauxite, activated charcoal or an activated clay. A further type of process converts objectionable forms of sulphur compounds, such as mercaptans, into less harmful forms, such as disulphides and polysulphides by various chemical treatments, for example plumbite treatments, hypochlorite treatments and copper chloride treatments. The above processes are particularly used for the treatment of gasoline fractions. With feedstocks of high molecular weight, a large proportion of the material is in the form of molecules containing at least one sulphur atom, and, particularly in selective separation processes, this would be removed with consequent low product yield.

Yet another type of process which has been found particularly useful for the treatment of middle distillate fractions such as gas oils comprises passing the material, generally with hydrogen under pressure, over a suitable catalyst at elevated temperature in order to eliminate the sulphur atoms from the sulphur-containing compounds in the form of hydrogen sulphide. It is the object of this type of process to sever the carbon-sulphur linkages in the sulphur-containing compounds, eliminating the sulphur in the form of hydrogen sulphide while at the same time hydrogenating the hydrocarbon fragments left as a result of the desulphurisation reaction.

It has been found, however, that in order to effect appreciable reductions in the sulphur content of high molecular weight material, for example residual fuel oils, the conditions required for such hydrogen treatments are severe; and the catalyst life is shortened by deposit formation.

According to the present invention a process for the desulphurisation of sulphur-containing hydrocarbon materials comprises submitting the hydrocarbon material to a selective oxidation reaction in which the sulphur-containing compounds are selectively attacked followed by subjecting the oxidised material to a thermal decomposition step in which the sulphur is eliminated as a sulphurous gas.

The process of the present invention is particularly suitable for the desulphurisation of petroleum fractions containing at least a proportion of material boiling above 250° C., for example crude oil and atmospheric and vacuum residues, which may contain 1% wt. of sulphur or more. Furthermore it is relatively easy to dispose of sulphurous gases and also the utility requirements of oxidative and thermal treatments are relatively low.

A number of oxidising agents may be employed in the selective oxidation step, for example organic and inorganic peroxides, hydroperoxides, organic and inorganic peracids, chlorine, oxides of nitrogen, ozone, molecular oxygen or air. Owing to its cheapness the preferred oxidising agent is molecular oxygen or air. The molecular oxygen or air may be promoted with suitable materials, for example metals from Group 5A and Group 8 of the Periodic Table or their salts or oxides, particularly platinum, palladium, nickel and vanadium. These promoters may be supported on a suitable material, for example alumina, soda-lime or active carbon. Where the supporting material has acidic, and therefore cracking, properties as in the case of alumina, these may be modified by treatment with an alkali metal, particularly sodium, or an ammonium compound. The use of such promoting materials improves the selective oxidation and also increases the rate of reaction, allowing the process to be completed in a shorter time or, alternatively, at a lower temperature.

The preferred reaction conditions required for this oxidation step will depend both on the material being treated as well as on the oxidising agent being employed. Preferably, however, a temperature within the range 80 to 180° C. is employed with a quantity of oxidising agent corresponding to between 1 and 6 active oxygen atoms per atom of sulphur in the feedstock for a period of between ½ and 20 hours. When using molecular oxygen or air as oxidizing agent suitable temperatures lie within the range 130 to 180° C. for periods of between 2 and 20 hours.

The thermal decomposition step is carried out at temperatures above 200° C. preferably above 250° C. and particularly in the range 300–400° C. for a period sufficient to ensure that all the gaseous decomposition products are given off. This period may be within the range ½ to 5 hours preferably between ½ and 2 hours. Under these conditions, the oxidised sulphur compounds are decomposed and the sulphur is liberated mainly as $SO_2$ although at higher temperatures in the region of 350° C. and over, increasing quantities of $H_2S$ are also liberated. The thermal decomposition step may also be carried out in the presence of suitable promoting materials. Suitable promoting materials comprise porous solids having acidic or basic properties for example, ferric oxide on alumina, bauxite, thoria on pumice, silica-alumina, soda-lime and acid sodium phosphate on carbon. Preferably, in the thermal decomposition step, a small quantity of an inert carrier gas, for example nitrogen, is passed through the reaction mixture to avoid local overheating and also to remove the gaseous decomposition products.

The invention is illustrated by means of the following examples:

EXAMPLE 1

An atmospheric residue derived from a Kuwait crude oil and containing 4% weight sulphur was first oxidised with various oxidising agents and subsequently subjects to a thermal decomposition by rapidly heating to 370° C. During the thermal decomposition stage a small quantity of an inert carrier gas (nitrogen) was passed through the material to remove the gaseous decomposition products and to prevent local overheating. For comparison, the thermal decomposition step was also carried out on the unoxidised residue. The results are indicated in the following Table 1:

TABLE 1

| Oxidising Reagent | Moles Reagent/g. Atom S | Oxidation Temperature, ° C. | Time, Hours | Sulphur, Percent Weight in Product |
|---|---|---|---|---|
| None | | | | 3.9 |
| Cumene Hydroperoxide | 2 | 110 | 1 | 3.6 |
| t-Butyl Hydroperoxide | 7 | 85 | 15 | 2.9 |
| Nitrogen Peroxide/Air | 1 | 30 | <2 | 3.7 |
| Hydrogen Peroxide/ Acetic Acid | 6 | 98 | 0.5 | 3.5 |
| Molecular Oxygen | 0.6 | 180 | 4 | 3.7 |
| Barium Peroxide | 6.0 | 90 | 0.5 | 3.6 |

EXAMPLE 2

The atmospheric residue of Example 1 was oxidised with molecular oxygen both alone and then in the presence of various promoters. The oxidised material was then thermally decomposed at 370° C. as in Example 1. Results are indicated in the following Table 2:

TABLE 2

| Oxidising Reagent | Modified By— | Temperature, ° C. | Absorbed Oxygen, Litres/ 100 g. | Duration, Hours | Sulphur, Percent Weight in Product |
|---|---|---|---|---|---|
| Molecular Oxygen | No added Agent | 180 | 2.1 | 3.0 | 3.9 |
| | Nickel Bromide on Active Carbon | 135 | 2.7 | 21 | 3.2 |
| | Platinum on Alumina | 160 | 5.6 | 6.5 | 3.3 |
| | Sodium and Platinum on Alumina | 200 | 5.7 | 5.5 | 3.5 |
| | Ammonium and Platinum on Alumina | 180 | 8.5 | 11.5 | 3.4 |
| | Palladium on Alumina | 180 | 8.2 | 6.0 | 3.5 |
| | Palladium on Alumina | 160 | 8.3 | 13.5 | 3.5 |
| | Vanadium Pentoxide on Alumina | 160 | 8.9 | 5.0 | 3.5 |
| | Vanadium Pentoxide on Active Carbon | 160 | 4.5 | 3.5 | 3.5 |
| | Vanadium Pentoxide on Soda-lime | 160 | 6.2 | 14.5 | 3.1 |
| | Sodium plus Vanadium Pentoxide on Alumina | 160 | 8.5 | 4.5 | 3.5 |

EXAMPLE 3

The atmospheric residue of Example 1 was oxidised in the presence of hydrogen peroxide and acetic acid under the following oxidation conditions:

Residue _____ 2 pts by weight.
Toluene _____ 1 pt by weight.
Glacial acetic acid _____ 1 pt by weight.
Hydrogen peroxide 30% w./v.___ Quantity corresponding to 6 active oxygen atoms per atom of sulphur.
Temperature _____ 98° C.
Time of reaction _____ 25 minutes.
Time of stripping _____ 25 minutes.

The oxidised residue was then subjected to a thermal decomposition step at 370° C. as in Example 1, first in the absence of any promoters and then in the presence of various promoters. Results are indicated in the following Table 3:

TABLE 3

Decomposition promoter: Sulphur Percent weight in product
None used _____ 3.0
$Fe_2O_3$ on alumina _____ 2.9
Bauxite (high iron) _____ 2.9
Thoria on pumice _____ 2.7
Soda-lime _____ 2.8
Silica alumina _____ 2.8
Acid sodium phosphate on carbon _____ 2.8

We claim:
1. A process for reducing the sulphur content of a sulphur-containing heavy hydrocarbon oil containing at least a proportion of material boiling above 250° C., which comprises treating the oil with a peroxide-containing oxidant, the mol ratio of peroxide to the sulphur present being from about 1:1 to about 6:1, heating the treated oil containing sulfones at a temperature from about 350° C. to about 400° C. under conditions to rupture the sulphur-carbon bond yielding volatile sulphur compounds, and recovering a heavy hydrocarbon oil of reduced sulphur content.

2. A process for the desulphurization of a petroleum fraction containing at least a major portion of material boiling above 250° C. and having a sulphur content of at least 1% by weight, the sulphur being present in said fraction in the form of sulphur compounds of high molecular weight, said process comprising contacting the fraction with an oxiding agent to selectively oxidize the sulphur-containing compounds of high molecular weight, said oxidation being carried out at temperatures within the range 80–180° C. and for a period of time between ½ and 20 hours, the amount of oxidizing agent employed being equivalent to between 1 and 6 active oxygen atoms per atom of sulphur in the fraction; subjecting the oxidized product to a thermal decomposition at a temperature in the range 200–400° C. and for a period of time from ½ to 5 hours to thermally decompose the oxidized sulphur compounds and liberate the sulphur as a sulphurous gas, removing the gaseous decomposition products from the product of said decomposition step, and recovering the desulphurized product.

3. A process in accordance with claim 2 wherein the oxidizing agent is selected from the group consisting of molecular oxygen and air, the temperature during the oxidation being between 130–180° C. and for a period of time between ½ and 20 hours.

4. A process as claimed in claim 2 wherein the oxidising agent is promoted with a material selected from the group consisting of Group 5A and Group 8 metals, their salts and oxides, on a suitable support.

5. A process as claimed in claim 2 wherein the thermal decomposition step is carried out at a temperature above 250° C.

6. A process as claimed in claim 5 wherein the thermal decomposition step is carried out at a temperature within the range 300–400° C., for a period of ½ to 2 hours.

7. A process as claimed in claim 2 wherein the thermal decomposition step is promoted by porous solid materials having acidic or basic properties.

8. A process as claimed in claim 7 wherein the thermal decomposition step is promoted by a material selected from the group comprising ferric oxide on alumina, bauxite, thoria on pumice, silica alumina, soda-lime and acid sodium phosphate on carbon.

9. A process as claimed in claim 2 wherein a small quantity of an inert carrier gas is passed through the reaction mixture in the thermal decomposition stage.

10. A process as claimed in claim 2 wherein a small quantity of nitrogen is passed through the reaction mixture in the thermal decomposition stage.

(References on following page)

References Cited by the Examiner

UNITED STATES PATENTS

| | | | |
|---|---|---|---|
| 1,581,369 | 4/1926 | Weir | 208—250 X |
| 1,795,278 | 3/1931 | Fischer | 208—208 |
| 1,840,269 | 1/1932 | Borgstrom | 208—196 |
| 1,971,172 | 8/1934 | Benedict | 208—208 |
| 2,414,963 | 1/1947 | McConnell | 208—208 |
| 2,955,123 | 10/1960 | Favis | 208—208 |

DELBERT E. GANTZ, *Primary Examiner.*

ALPHONSO D. SULLIVAN, *Examiner.*

S. P. JONES, *Assistant Examiner.*

UNITED STATES PATENT OFFICE
CERTIFICATE OF CORRECTION

Patent No. 3,284,342            November 8, 1966

Wilfred Samuel Nathan, deceased, by Shirley Gertrude Nathan and Gerald Stanley Davis, personal representatives, et al.

It is hereby certified that error appears in the above numbered patent requiring correction and that the said Letters Patent should read as corrected below.

In the heading to the printed specification, line 12, for "Nov. 20, 1960" read -- Nov. 22, 1960 --; column 2, line 10, for "ntrogen" read -- nitrogen --; line 65, for "subjects" read -- subjected --.

Signed and sealed this 12th day of September 1967.

(SEAL)
Attest:

ERNEST W. SWIDER
Attesting Officer

EDWARD J. BRENNER
Commissioner of Patents